(12) United States Patent
Amiel et al.

(10) Patent No.: US 6,338,863 B1
(45) Date of Patent: Jan. 15, 2002

(54) COATED FROZEN CONFECTIONERY ARTICLE AND METHOD FOR MAKING IT

(75) Inventors: Olivier Amiel, Althen Des Paluds; Charles-Austin Sunderland, Goincourt, both of (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/213,701

(22) Filed: Dec. 17, 1998

(30) Foreign Application Priority Data

Dec. 18, 1997 (EP) ............................................ 97203996

(51) Int. Cl.⁷ ................................................. A23G 3/00
(52) U.S. Cl. ........................... 426/95; 426/91; 426/101; 426/104; 426/289; 426/296
(58) Field of Search ............................ 426/91, 95, 101, 426/104, 289, 296, 565, 439

(56) References Cited

U.S. PATENT DOCUMENTS

| | | |
|---|---|---|
| 1,813,099 A | 7/1931 | Story |
| 4,020,188 A * | 4/1977 | Forkner ........................ 426/95 |
| 4,708,881 A * | 11/1987 | Ishikuma et al. ............ 426/524 |
| 4,822,627 A * | 4/1989 | Clegg et al. ................. 426/101 |
| 5,256,426 A * | 10/1993 | Tomioka et al. ............. 426/101 |

FOREIGN PATENT DOCUMENTS

| | | | |
|---|---|---|---|
| AT | 4866369 A | 9/1970 | |
| DE | 43 22 927 A1 | 1/1995 | |
| EP | 0295865 | 12/1988 | |
| GB | 201100 | * 7/1923 | ................... 426/91 |
| GB | 846777 | 8/1960 | |
| JP | 61056045 | 3/1986 | |
| JP | 61185176 A | 8/1986 | |
| WO | 95 20883 A | 8/1995 | |

OTHER PUBLICATIONS

L–art Culinaire Francais, 1976, Flammadrion, Paris, p. 687.

* cited by examiner

*Primary Examiner*—Milton I. Cano
*Assistant Examiner*—Hao Mai
(74) *Attorney, Agent, or Firm*—Winston & Strawn

(57) ABSTRACT

An iced-confectionary article coated with a layer of cooked batter, in particular in the form of a popsicle. This article is prepared by dipping a precooled iced confection center, fitted with a stick, into an aerated meringue-like liquid frying batter, cooking the batter and then hardening and freezing of the article.

27 Claims, 1 Drawing Sheet

COATED FROZEN CONFECTIONERY ARTICLE AND METHOD FOR MAKING IT

TECHNICAL FIELD OF THE INVENTION

The present invention relates to an iced-confectionery article coated with batter and to a method for making such an article.

BACKGROUND OF THE INVENTION

Iced cake articles comprising a center made of iced confectionary coated with a batter, in particular of the doughnut type which is deep-fat fried, currently exist. Usually, the ice-cream center is surrounded by a thin layer of unrisen batter and the whole is immersed in a boiling fatty substance to cook and brown this batter. The article must be eaten quickly because the ice cream is not protected against heat exchanges since it is in direct contact with the hot coating batter and it partially melts during the preparation. To industrially manufacture this type of product and to be able to transport and distribute it, it is necessary to overcome this difficulty.

Various solutions have been proposed to thermally insulate the center from the batter. In U.S Pat. No. 4,822,627, for example, a semi-finished article is made which is intended to be fried by the consumer. This article comprises of an ice-cream center coated with a multilayer coating composition suitable for deep-fat frying, comprising a first liquid layer which adheres to the center, onto which a second layer of breadcrumbs is incorporated and this second layer is itself coated with a third layer of liquid batter, the whole then being frozen. According to U.S. Pat. No. 4,708,881, for example, cream croquettes or decorated ice-cream articles can be made by carrying out the freezing in a freezer, tunnel or gyrofreezer in two steps. Thus, a center is first frozen under temperature conditions which produce a maximum amount of ice crystals, this center is then decorated or coated in an intermediate operation carried out outside the freezer and the composite product is treated in the same freezer at a lower temperature. Although it is mentioned that the center can be coated with a liquid composition and the whole fried, these operations are not described.

In U.S Pat. No. 4,020,188, an ice-cream center is formed and wrapped in a layered composite of rolled-out pastry with a continuous layer of protective material sitting next to the center and insulating the pastry from the center, and the whole is frozen and cooked.

SUMMARY OF THE INVENTION

The invention provides an iced-confectionery article having a center made of iced composition and including a coating of a cooked batter. The iced composition center of the article is coated directly with a coating composition made of meringue-like aerated frying batter which then is cooked to form the article. This article does not require an intermediate layer serving as a thermal barrier to insulate the center from the batter, and this is done without the batter soaking up liquid originating from melting of the iced composition. In one embodiment, the article according to the invention is a popsicle having a center whose shape includes concave parts, i.e. hollow parts, and comprises a handle stick, while in another embodiment, the iced popsicle is a ring-shaped doughnut.

The invention also relates to a method for making a coated iced-confectionary article as described above, characterized by the following steps: 1) an iced composition constituting the center is cooled so that its surface is at a temperature of not more than about −40° C.; 2) the cooled center is dipped in a meringue-like aerated liquid frying batter; 3) the coated center is cooked for a period of time and at a temperature which allow the coating to be fried or cooked; and 4) the article is cooled to low temperature (i.e. below freezing) so as to freeze it and harden it.

BRIEF DESCRIPTION OF THE DRAWINGS

The specific embodiments described below as examples illustrate the invention with the aid of the attached drawings, in which.

DETAILED DESCRIPTION OF THE PREFERRED EMBODIMENTS

Figure 2:
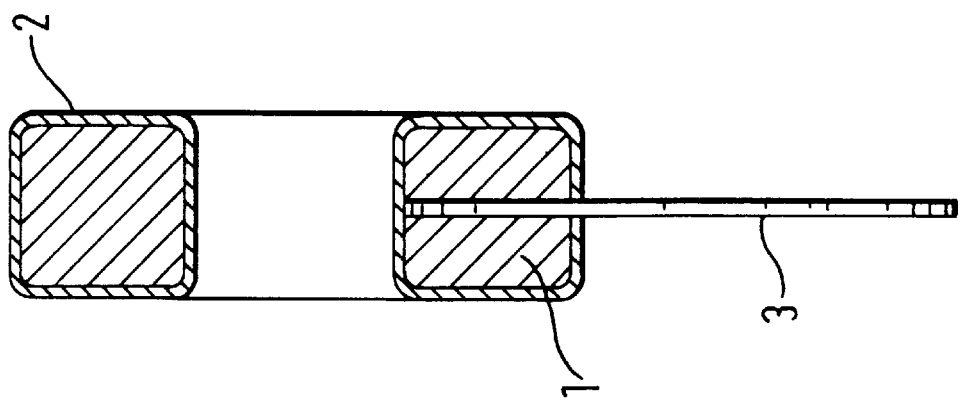
FIG. 2 is a longitudinal median section through the article.

In the context of the invention, a "frying" batter is generally a standard doughnut or pancake batter made of flour, eggs, milk, sugar, oil, water and salt.

The coating composition comprises a meringue, i.e., a mixture of egg white and sugar preferably containing from about 30 to about 40% by weight of sugar per about 60 to about 70% by weight of egg white. In the meringue, the egg white is beaten so as to aerate the meringue. Pasteurized egg white is preferably used, but any egg white substitute can be used from the point of view of its functional properties, in particular the foaming power and the ability to gel under the effect of heat. Such a substitute can be, for example, made of lactose serum protein or soya protein. A mixture of modified cellulose and/or of hydrocolloids, for example of modified cellulose and of xanthan gum or guar gum, can also be used.

The density of the meringue is between about 0.1 and 0.3 g/cm and is preferably about 0.2 g/cm$^3$. In the coating composition, the meringue represents about 5 to about 30% by weight and the frying batter represents about 70 to about 95% by weight. Preferably, the meringue represents about 10% by weight and the frying batter about 90% by weight.

As a variant, the ingredients constituting the meringue can be mixed directly in the frying batter and then aerated or made to rise. Thus, the coating composition is whipped from about 20 to about 150% in volume, i.e. it has a density of between about 0.45 to about 0.95 g/cm$^3$ and preferably of about 0.9 g/cm$^3$. The coating composition used according to the invention is noteworthy in that it allows a regular coating of uniform thickness by simple dipping of a frozen center made of iced composition of any shape. This is true even in the case where this center includes convex parts and concave parts, in particular when it has a hole running through it, such as, for example, a ring, this being on account of the fluidity of the coating composition.

Furthermore, this coating composition has the ability to form a thermal barrier against the intense heat transfers such as, for example, those caused by deep fat frying. It hap been observed, for example, that at the end of frying at about 180° C. for about 45 sec in oil, the temperature of the iced-confectionary center remained less than about −20° C. Thus, it is possible to proceed directly from dipping the frozen center in the coating composition to frying in the oil without resorting to an intermediate operation of hardening of the article by freezing.

Another advantage is the possibility, for example in the specific case of a ring-shaped popsicle, of handling the article by the stick up to and including the frying step, without weakening the anchoring of the stick in the iced-composition center. This occurs despite the fact that the iced-composition this center can only be held by the crown of the ring, i.e. in a relatively low thickness of iced composition, for example of only about 22 mm.

Any method of forced cooling to very low temperature can be used to cool the iced-composition center. Any temperature below freezing can be used, but lower temperatures require shorter cooling times. The center is preferably dipped in liquid nitrogen for a period of about 6 to about 20 s, and preferably for about 10 s. It is then coated with an aerated meringue-like liquid batter as described above, preferably by dipping it in a bath of batter. The batter can be cooked by any cooking means, for example by passing it through a convection oven, an infrared oven, by contact with a heat-conducting plate or band, for example one made of heated steel, or alternatively by dipping into hot oil. This operation can preferably be carried out at about 180° C. for about 40 to about 60 s. The final step of freezing and hardening the assembly consisting of the center and the cooked coating batter can take place by any means which ensures a temperature of not more than about −40° C. on either side of the coating and the center, for example, in a tunnel with a stream of liquid nitrogen, for about 10 to 50 and preferably about 30 min.

EXAMPLES

The following examples are provided to illustrate preferred articles of the invention. In these examples, the parts and percentages are given by weight, except where otherwise mentioned.

Example 1

28.4 parts of ordinary wheat flour are mixed, in a fast mixer, with salt, 2.2 parts of powdered skimmed milk and 13.5 parts of crystalline sugar, after which 6.8 parts of pasteurized liquid whole egg and 34.2 parts of water are added until the powders are fully dispersed in the liquid. 4.5 parts of sunflower oil are then added and this mixture is mixed thoroughly to obtain a homogeneous liquid batter.

Separately, a meringue is raised starting with 62.5 parts of pasteurized egg white and 37.5 parts of crystalline sugar, with a beater at moderate speed until the mixture acquires a firm consistency, the density of this mixture being about 0.2 g/cm$^3$.

10 parts of meringue are then incorporated into the above liquid batter in order to obtain a homogeneous, aerated, fluid frying batter, with a density of 0.9 g/cm$^3$ and which is whipped to 34% in volume.

A hollow roll of vanilla ice cream is extruded, at about −5° C., and is cut into ring-shaped sections, into the crown of which is inserted a flat stick, thus obtaining a preform. After cooling the preform to −30° C. at the core, in a freezer tunnel, it is taken by the stick and immersed in a bath of liquid nitrogen for 5 s. After waiting for 4 s, the preform is dipped in the aerated frying batter for 5 s and, after waiting for 20 s, the preform coated with a continuous film of batter of homogeneous thickness is immersed in sunflower oil at 180° C. for 45 s so as to fry it. After waiting for 15 s, the fried article is placed on a cold plate and passed through a cooling tunnel with nitrogen at −40° C. for 30 min, after which it is wrapped in a "flow-pack" wrapping and hardened to −30° C. at the core in a freezer chamber.

The article obtained is entirely coated with a continuous batter which is distributed homogeneously over the entire surface of the ring in a constant thickness and cooked uniformly.

Example 2

The process is performed as in Example 1, except that the meringue-like batter is produced by directly incorporating 0.5 part of modified cellulose, 4 parts of egg white and 0.4 part of xanthan gum, as replacement for the 10 parts of meringue in Example 1, into the other ingredients and the batter is beaten so as to aerate it, such that its density is 0.95 g/cm$^3$ and it is whipped to 30% in volume.

The article obtained is entirely coated with a continuous batter which is distributed homogeneously over the entire surface of the ring in a constant thickness and cooked uniformly.

Example 3

Figure 1:
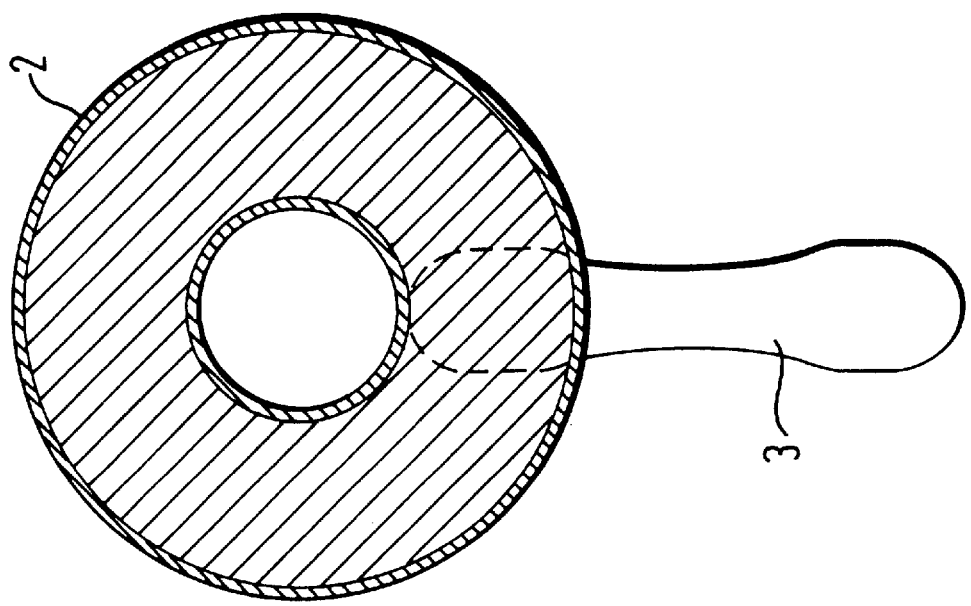
FIG. 1 is a front view of the article.

In FIGS. 1 and 2, the article comprises a center 1 made of ice cream in the shape of a ring which is uniformly coated with a layer of cooked batter 2. A handle stick 3 in the shape of a spatula is anchored in the entire thickness of the ring of ice cream and is flush with the coating of batter.

Although the present invention is described in detail with reference to specific embodiments thereof, it will be understood that variations which are functionally equivalent are within the scope of the present invention. Indeed, various modifications of the present invention, in addition to those shown and described herein, will become apparent to those skilled in the art from the foregoing description and accompanying drawings. Such modifications are intended to fall within the spirit and scope of the appended claims.

What is claimed is:

1. A ice confectionery article comprising:
   a center component having a shape that includes concave and convex parts surrounding a hole and having an exterior surface;
   a coating covering the entire exterior surface and comprising a cooked, aerated frying batter that includes 70 to 95 percent of a batter and 5 to 30 percent of a meringue containing sugar and egg white or an egg white substitute, wherein the coating does not fill in the hole; and
   a handle for the article.

2. The article of claim 1, wherein the center component has the shape of a ring.

3. The article of claim 1, wherein the coating of batter is whipped from about 20 to about 150 percent in volume and has a density of from about 0.45 to about 0.95 g/cm$^3$.

4. The article of claim 1, wherein the meringue is a mixture of egg white and sugar containing from about 30 to about 40 percent by weight of sugar per about 60 to about 70% by weight of egg white.

5. The article of claim 1, wherein the batter comprises flour, eggs, milk, sugar, oil, water, and salt.

6. The article of claim 1, wherein the meringue in the frying batter has a density of about 0.1 g/cm$^3$ to 0.3 g/cm$^3$.

7. The article of claim 1, wherein the meringue substitute is selected from the group consisting of lactose serum protein, soya protein, modified cellulose, hydrocolloids, and mixtures thereof.

8. An iced-confectionery article comprising:
   a center made of an iced composition having a concave shape and being configured in the form of a ring; and
   a coating on the ring, the coating comprising a cooked, aerated meringue-containing batter which, prior to cooking, is whipped from about 20 to about 150% in volume, has a density of about 0.45 to about 0.95 g/cm$^3$, and present at a thickness which forms a thermal barrier that protects the ring during cooking of the batter in 180° C. oil.

9. The iced confectionery article of claim 8, wherein the ring is hollow.

10. The iced confectionery article of claim 8, which further comprises a handle.

11. The iced confectionery article of claim 8, wherein the batter includes a meringue or meringue substitute in an amount of about 70% to 95% by weight.

12. The iced confectionery article of claim 11, wherein the batter comprises flour, eggs, milk, sugar, oil, water, and salt, and is present in an amount of about 5% to about 30% by weight.

13. The iced confectionery article of claim 11, wherein the meringue is a mixture of egg white and sugar containing about 30% to about 40% by weight of sugar and about 60% to about 70% by weight of egg white.

14. The iced confectionery article of claim 11, wherein the meringue substitute is a lactoserum protein, a soya protein, a modified cellulose, a hydrocolloid, or mixtures thereof.

15. The iced confectionery article of claim 11, wherein the meringue in the frying batter has a density of about 0.1 g/cm$^3$ to 0.3 g/cm$^3$.

16. An iced-confectionery article comprising:
   a center made of an iced composition having a surface, a concave shape and being configured in the form of a ring; and
   a coating adhered directly to the surface of the ring, the coating comprising a cooked, aerated meringue-containing batter which, prior to cooking, is whipped from about 20 to about 150% in volume, has a density of about 0.45 to about 0.95 g/cm$^3$, and is present at a thickness which forms a thermal barrier that protects the ring during cooking of the batter in 180° C. oil.

17. The iced confectionery article of claim 16, wherein the ring is hollow.

18. The iced confectionery article of claim 16, which further comprises a handle.

19. The iced confectionery article of claim 16, wherein the batter includes a meringue or meringue substitute in an amount of about 70% to 95% by weight.

20. The iced confectionery article of claim 19, wherein the batter comprises flour, eggs, milk, sugar, oil, water, and salt, and is present in an amount of about 5% to about 30% by weight.

21. The iced confectionery article of claim 19, wherein the meringue is a mixture of egg white and sugar containing about 30% to about 40% by weight of sugar and about 60% to about 70% by weight of egg white.

22. The iced confectionery article of claim 19, wherein the meringue substitute is a lactoserum protein, a soya protein, a modified cellulose, a hydrocolloid, or mixtures thereof.

23. The iced confectionery article of claim 19, wherein the meringue or meringue substitute in the batter has a density of about 0.1 g/cm$^3$ to 0.3 g/cm$^3$.

24. An iced confectionery article consisting essentially of:
   a center made of an iced composition having a concave shape and being configured in the form of a ring;
   a handle for the article, anchored in the center; and
   a coating adhered directly to the surface of the ring, the coating comprising a cooked, aerated batter which, prior to cooking, includes a meringue or meringue substitute that has a density of about 0.1 g/cm$^3$ to 0.3 g/cm$^3$, is whipped from about 20% to about 150% in volume, has a density of about 0.45 g/cm$^3$ to about 0.95 g/cm$^3$, and is present at a thickness which forms a thermal barrier that protects the ring during cooking of the batter in 180° C. oil.

25. The iced confectionery article of claim 19, wherein the batter comprises flour, eggs, milk, sugar, oil, water, and salt, and is present in an amount of about 5% to about 30% by weight and the meringue or meringue substitute is present in an amount of about 70% to 95% by weight.

26. The iced confectionery article of claim 25, wherein the meringue is a mixture of egg white and sugar containing about 30% to about 40% by weight of sugar and about 60% to about 70% by weight of egg white.

27. The iced confectionery article of claim 25, wherein the meringue substitute is a lactoserum protein, a soya protein, a modified cellulose, a hydrocolloid, or mixtures thereof.

* * * * *

UNITED STATES PATENT AND TRADEMARK OFFICE
CERTIFICATE OF CORRECTION

PATENT NO.    : 6,338,863 B1
DATED         : January 15, 2002
INVENTOR(S)   : Amiel et al.

It is certified that error appears in the above-identified patent and that said Letters Patent is hereby corrected as shown below:

Title page,
Item [56], References Cited, FOREIGN PATENT DOCUMENTS, change the 2-letter country designation of the first-listed foreign patent document from "AT" to -- AU --.

Column 6,
Line 27, change "19," to -- 24, --.

Signed and Sealed this

Twenty-fifth Day of March, 2003

JAMES E. ROGAN
*Director of the United States Patent and Trademark Office*